United States Patent [19]

Kadekodi et al.

[11] Patent Number: 4,712,137
[45] Date of Patent: Dec. 8, 1987

[54] HIGH DENSITY CCD IMAGER

[75] Inventors: Narayan K. Kadekodi, Torrance; Abd-El-Fattah A. Ibrahim, Palos Verdes Estates; Roland J. Handy, Northridge, all of Calif.; Jagdish C. Tandon, Fairport, N.Y.

[73] Assignee: Xerox Corporation, Stamford, Conn.

[21] Appl. No.: 285,250

[22] Filed: Jul. 20, 1981

[51] Int. Cl.[4] ............................................. H04N 3/14
[52] U.S. Cl. ............................ 358/213.29; 358/213.26
[58] Field of Search ............... 358/212, 213, 109, 113, 358/293, 294, 280, 41, 43, 44, 48, 54, 75, 78; 250/208, 209, 211 R, 578; 357/24 LR; 29/572

[56] References Cited

U.S. PATENT DOCUMENTS

| | | | |
|---|---|---|---|
| 3,940,602 | 2/1976 | Lagnado et al. | 235/181 |
| 3,980,817 | 9/1976 | Penn | 358/212 |
| 4,010,319 | 3/1977 | Levine | 358/213 |
| 4,012,587 | 3/1977 | Ochi et al. | 358/213 |
| 4,031,315 | 6/1977 | Pfleiderer | 358/212 |
| 4,032,976 | 6/1977 | Levine | 358/213 |
| 4,064,533 | 12/1977 | Lampe et al. | 358/105 |
| 4,081,841 | 3/1978 | Ochi et al. | 358/213 |
| 4,084,190 | 4/1978 | Stein | 358/213 |
| 4,084,192 | 4/1978 | DeFranould et al. | 358/213 |
| 4,146,786 | 3/1979 | Agulnek | 250/235 |
| 4,178,614 | 12/1979 | Sauer | 358/213 |
| 4,189,749 | 2/1980 | Hiroshima et al. | 358/167 |
| 4,192,015 | 3/1980 | Tompsett | 365/114 |
| 4,200,892 | 4/1980 | Weimer | 358/213 |
| 4,209,806 | 6/1980 | Noike et al. | 358/213 |
| 4,271,428 | 6/1981 | Herbst | 358/54 |
| 4,272,684 | 6/1981 | Seachman | 250/578 |

Primary Examiner—James J. Groody
Attorney, Agent, or Firm—Franklyn C. Weiss

[57] ABSTRACT

A high density charge coupled device imaging array 88 with a bilinear array of photosites on a single integrated circuit chip is utilized in an image scanning configuration. Offset photosites 90a, 94a in the two separated rows are coupled via transfer gates 98, 106 to storage registers 104, 108 and then to two shift registers 110, 112, and via transfer gates 96 directly to two shift registers 100, 102 in a quadrilinear array. The output of these four shift registers 110,102,110,112 are multiplexed to generate a single output pulse train representative of the information scanned. By separating the offset rows 90, 94 of photosites by a row 92 therebetween, the necessity for accurate alignment of the photosite areas is reduced.

10 Claims, 5 Drawing Figures

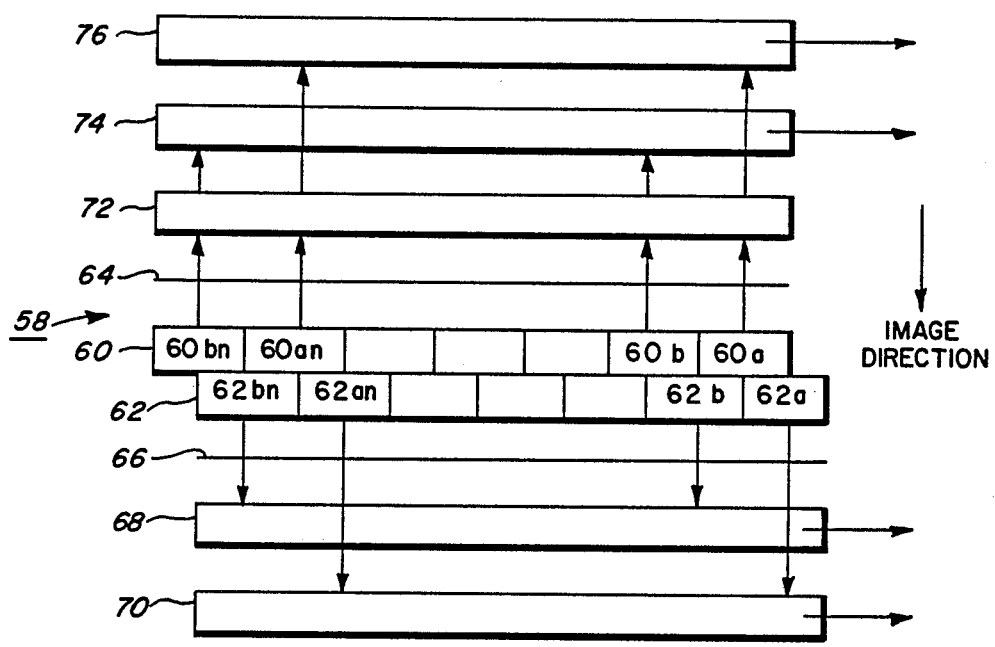

HIGH DENSITY CCD IMAGER

The invention relates to a high resolution, high density imager employing a staggered, separated CCD sensor structure on a relatively short silicon substrate which permits high resolution imaging to generate a single pulse train indicative of scanned information utilizing a quadrilinear structure register array.

BACKGROUND OF THE INVENTION

Image scanners are used to convert information from one medium to another. For example, in document scanning the information on a document is converted from printed matter on a page to electrical signals for transmission to another unit, for information handling, for electronic storage, etc.

Charge coupled devices (CCD's) utilizing charge transfer technology are one modern application of technology useful in image scanners. Light is impinged on the photosites on a CCD device, the device detects this information and converts it to electrical signals for subsequent use. The familiar integrated cicuit structure on a chip of a few tenths of an inch by a few tenths of an inch (8 mm × 8 mm) does not lend itself to CCD imager structure. If optics are eliminated, a CCD imager would have to be as wide as the page being scanned and located within several thousandths of an inch from the page to achieve adequate resolution. The cost of such a device would be extremely high because the manufacturing yield of such a large device would be very, very low. Thus, shorter CCD devices have been used but these have concomitant drawbacks. When several shorter CCD imagers are used to sense the same object line, the ends of the photosensor arrays overlap optically or mechanically or else a narrow stripe on the scanned page will be blank. Further, complicated optics for page width scanners must be utilized.

Use of small, dense, linear CCD imagers have also been shown with the use of reduction optics. However, when the size of the image device is reduced, the resolution suffers due to the limited number of available photosites. One method known to solve this problem is the use of CCD imagers with beam splitter optics. That is, the optics divide the scanned light information into two or more beams, one for each CCD imager, depending on the resolution desired. However, the cost is also very high in this technique due to added electronics and optics. One example of such a system is disclosed in Ser. No. 949,179, filed Oct. 6, 1978, now U.S. Pat. No. 4,272,684 and assigned to the same assignee.

According to the present invention, a high density CCD imaging array with a bilinear array of photosites on a single integrated circuit chip is utilized in an image scanning configuration. Offset photosites in two separated rows are coupled by transfer gates to four shift registers in a quadrilinear array. Registers for intermediate storage are included to allow the signals from the separate photosites to be stepped to the indicated shift registers. The outputs of these shift registers are multiplexed to generate a single output pulse train representative of the information scanned.

DESCRIPTION OF THE DRAWINGS

For a more complete understanding of the invention, reference may be had to the following detailed description of the invention in conjunction with the drawings wherein:

FIG. 3 is a schematic diagram of a charge coupled device for use in an imaging system in accordance with the principles of an invention set forth in a copending application.

FIG. 1 shows a charge coupled device 10 already known in the industry for use as an image sensor in an imaging system. A plurality of photosites 10 would be deposited in the normal prior art manner for construction of such a CCD. These photosites, being sensitive to the amount of light impinged upon themselves, deposit a requisite amount of charge beneath in response to the applied light. Via CCD transfer gates 14a and 14b, the stored charge beneath each photosite 12 is transferred to their respective shift registers 16a and 16b. As can be seen in FIG. 1, all the odd photosites are coupled to shift register 16b and all the even photosites are coupled to shift register 16a. At the proper time, the information is shifted out to the right (or left) side of the device 10 to subsequent circuitry. Such subsequent circuitry would mix the outputs of registers 16a and 16b such that the output pulse train would be representative of the input applied light information. All of the above circuitry could be on the same integrated circuit chip as in the circuitry shown in FIG. 1.

In operation, as in an image scanning device such as a facsimile transmitter or document processor, relative motion would exist between the image scanner, including CCD 10, and the document or other manifestation being scanned. Thus, for example, the CCD 10 would move down the page in which FIG. 1 is depicted, thus translating through the image of the document being scanned; or, of course, CCD 10 could remain stationary with the document moving in the upward direction; or both. The imaging light beam would reflect from the document onto the photosites of device 10. Focusing and other optics, not shown, may also be utilized. As the document is relatively moved in relation to the scanner embodying the device 10, the outputs of shift registers 16a and 16b are representative of the information on the document in a line by line representation.

FIG. 2A shows a CCD imaging device disclosed and described in copending application Ser. No. 284,770, now U.S. Pat. No. 4,432,017 which is similar to that of FIG. 1 but with a major difference. Two rows of photosites 30, 32 are provided, one offset from the other, on a single CCD integrated circuit chip 28. With the photosites offset, as shown, the density of the photosites on one CCD imager is increased and also the scan resolution is increased due to the fact that information that exists between the photosites is now detected by the additional row of photosites. Thus, row 32 of photosites detects part of the information by sampling image data at the centers of the row 32 of photosites, and row 30 detects additional information by sampling at the centers of row 30 detectors midway between the row 32 detectors, which information will be joined electrically later as hereinbelow described.

Figure 1:
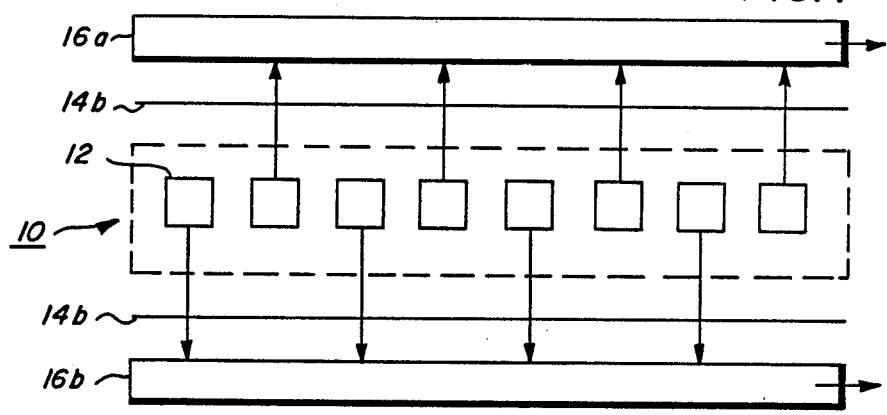
FIG. 1 is a schematic diagram of a charge coupled imaging device for use in an imaging typically known in the industry.

As set forth above in conjunction with the description of FIG. 1, there is a relative motion between CCD 28 and the document or other than being scanned. For this figure, it is assumed for purposes of description that the image of the document is moving upward while the CCD 28 remains stationary. At time t0, then, the first line of information to be scanned appears on the row 32 of photosites. Any means for direction of this light information may be used. That is, reflective optics, or transmissive optics, or direct projection thereon can be manifested. At this time, or previously, all other stored information in CCD 28 has been cleared, or is subsequently ignored. At time t0, therefore, the information on the first scan line is detected by the row 32 of photosites. If the line of data is seen from right to left, photosite 32a would detect the first bit of data on the line, while photosite 32b would detect the third bit of data on the line.

Before the next scan line of data is stepped or moved into position to be scanned by row 32 of photosites, that is, at time t1, the information detected by this row 32 of photosites and stored thereat is transferred by transfer gates 36 to storage or holding register 38. Thus, register 38 now has stored the information which used to be stored below the photosites 32. The row 32 of photosites now awaits scan line two to be presented to it, while row 30 of photosites now awaits the first scan line.

At time t2, the second line of scan data is detected by row 32, while the first line of scan data has reached row 30. Row 32 now reads or detects the information in the second line of scan data. Row 30 is now reading the spaces between the photosites in row 32. That is, bits two and four are now read by photosites 30a and 30b, respectively. Photosites 32a and 32b are reading, respectively, the first and third bits from the second scan line of data.

At t3, before the next scan line of data is incremented before the CCD imager, the contents of register 38 are transferred via transfer gates 40 to shift register 44. Then the contents of row 32 of photosites is transferred via transfer gates 36 to storage register 38. The contents of row 30 of photosites is transferred to shift register 42 via transfer gates 34. It is seen that shift register 44 now contains the even bits of data from the first scan line of data while shift register 42 contains the odd bits of data from the same first scan line of data.

At t4, the next lines of data are brought before the rows 30, 32 of photosites, while shift registers 42, 44 are pulsed with a high frequency shift signal at this time to shift out the stored signals. Thus, the contents of these two shift registers are shifted out and joined, i.e., multiplexed into a single pulse train either on the same integrated circuit chip or by subsequent external circuitry.

The scan, shift, and transfer procedure continues with the rows 30, 32 of photosites reading every line desired in sequential fashion as described above. If each line of photosites contains 3000 CCD photosites, for example, then 6000 points or pixels of data can be read per inch or other resolution if reduction optics are utilized.

Figure 2A:
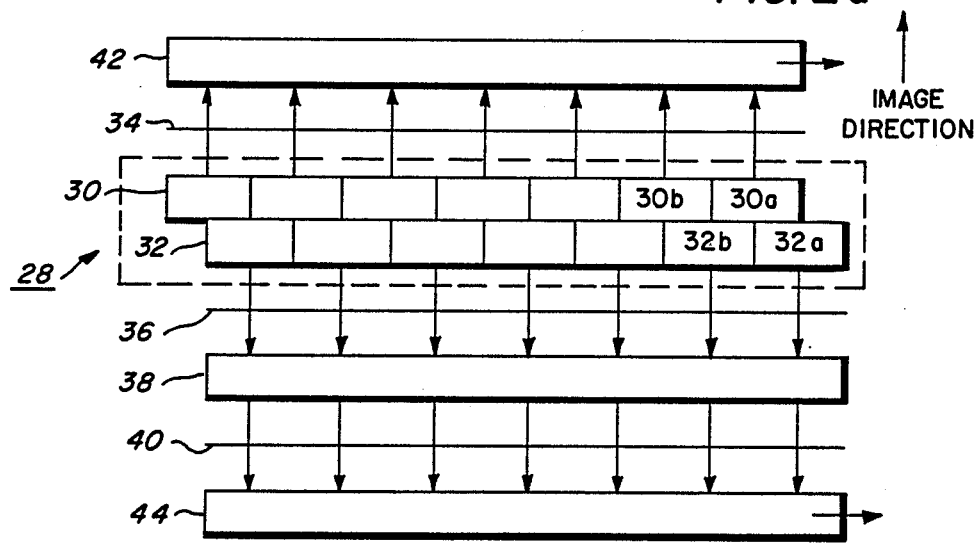
FIG. 2A is a schematic diagram of a charge coupled imaging device for use in an imaging system in accordance with the principles of the present invention set forth in copending application.

The storage register in FIG. 2A may be a duplicate of a row of photosites with a light shield over it. No horizontal shifting is required in this region as it is for shift registers 42, 44.

The two linear photosensor arrays are generally located in close proximity to each other so that they can sample adjacent (or nearly adjacent) portions of the same image and reconstruct a single scan line with a minimum of data storage requirements. It is possible to accommodate much larger separations between the two photosensor arrays on the same substrate and eliminate the data storage requirements by optically generating two separate but identical images, one image for each array and so aligned that each photosensor array sees the same information line within its associated image. This latter technique, however, requires the use of precisely aligned beam splitting components in the optical system and a lens capable of producing two displaced images which are virtually identical. It is therefore a major advantage of the adjacent bilinear photosensor arrays that only one image need be generated by the optical system, and the expensive beam splitting components may be eliminated. It is another significant advantage that the image forming quality of the lens may be specified with less stringent requirements, enabling lower cost lens components.

Figure 2B:
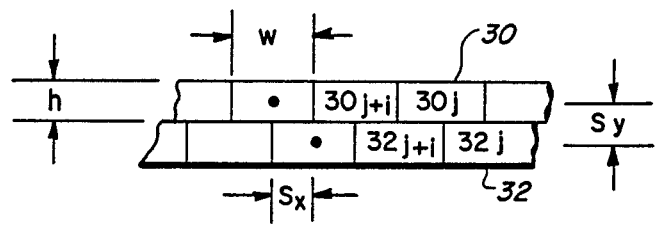
FIG. 2B is an expanded view of FIG. 2A showing the preferred geometric properties of the individual photosite apertures.

The individual photosites apertures or windows (photosensitive area associated with each photosite) will have a preferred shape, depending upon the horizontal and vertical data sampling pitches selected for the scanner system. These relationships are illustrated with the notation of FIG. 2B. The effective horizontal sampling pitch $S_x$, is the effective distance between the centers of pixels in a horizontal direction in FIG. 2B, considering the simultaneous sampling of both photosensor arrays 30 and 32. The vertical sampling pitch, $S_y$, is the center-to-center distance between adjacent scan lines in the image plane. For exactly adjacent photosensor arrays, it is the vertical separation between the centers of the two photosensor arrays, as shown in FIG. 2B. Parameters $S_x$ and $S_y$ are typically determined by fundamental design requirements of the scanner system, and the photosites aperture geometry is selected to produce apertures whose centers are effectively separated by $S_x$ and $S_y$ in the horizontal and vertical directions, respectively.

It is also generally desirable to maximize the photosite area within the constraints imposed by the required sampling pitches, $S_x$ and $S_y$, so that the signal-to-noise ratio of the detector is maximized. Each of the detector apertures is assumed to have approximately rectangular shape with a width, w, and a height, h, as shown in FIG. 2B. All of the photosite apertures are assumed to be nearly identical to each other. As an example, it is frequently required to sense images on equal vertical and horizontal sampling pitches or intervals; i.e., $$S_x = S_y \tag{1}$$

Under this condition, it is clear from FIG. 2B that $$S_x = s/2$$

and $$S_y = h, \tag{2}$$

or that a preferred aspect ratio for the typical photosite is $$w = 2h \tag{3}$$

For example, if the sampling pitch in the image plane is 10 μm (horizontally and vertically), then each photosite aperture should have a height of 10 μm and a width of 20 μm. This provides a maximum aperture area which is properly centered about the selected (equal) sampling centers.

More generally, if the sampling pitches are not exactly equal, but are chosen so that the horizontal sampling pitch is equal to a numerical constant, k, times the vertical sampling pitch; i.e., $$S_x = kS_y, \quad (4)$$

then the preferred aperture aspect ratio will differ from the previous example. In this general example, combining equations (2) and (4) gives the preferred conditions $$w = 2kh. \quad (5)$$

For example, if the horizontal sample pitch were selected to be equal to 0.75 times the vertical sampling pitch (k=0.75), then the preferred aspect ratio would be $$w = 2(0.75)h,$$

or $$w = 1.5 h. \quad (6)$$

If the horizontal sampling pitch of 9 μm were selected as an example, then the vertical sampling pitch would be 9/0.075 = 12 μm. The corresponding aperture width according to equation (2) is 18 μm and height is 12 μm; i.e., w/h = 1.5 as shown in equation (6).

It is not necessary to center the apertures according to the selected sampling pitches, as described above. If the apertures are not so centered, however, it becomes necessary to generate unequal vertical and horizontal magnifications in the optical system. Such anamorphic optical systems are difficult to design and generally very expensive to fabricate. An important advantage of the preferred aperture aspect ratio of equation (5) and the centering of the apertures on selected sampling centers is the ability to use lower cost, conventional, spherical optical systems.

FIG. 3 is an improvement over the invention set forth in FIG. 2 and represents an invention disclosed and described in copending application Ser. No. 284,742, now U.S. Pat. No. 4,438,457. As can be seen in FIG. 3, there are four shift registers instead of two in a quadrilinear array. With four output shift registers instead of two, the density of the CCD components on the single integrated circuit can be even greater than before, leading to a shorter, denser CCD device.

In operation, then, at time t0, the first line of data will be adjacent row 60 of photosites. As in the figures described above, there is relative movement between the imager 58 and the document or other image being scanned. In FIG. 3, it is assumed that the first line of information is relatively moving downward. At this time t0, the charge is deposited beneath each photosite in direct relation to the amount of light impinging on each said photosite. Row 60 of photosites is, accordingly, scanning and detecting the even photosites 60a, 60b, reading right to left. At time t1, the contents of charge stored at row 60 of photosites is transferred to storage register 72 via transfer gates 64 before the first line of data is incremented to row 62 of photosites. At time t2, the first scan line of data reaches row 62 of photosites, while scan line 2 of data now reaches row 60 of photosites. At this time row 62 of photosites scans and detects for the odd bits of data 62a, 62b in the first scan line of data, and row 60 of photosites is scanning and detecting the even pixels or bits in the second scan line of data.

At time t3, several things happen before the scan lines of data are incremented. The contents of the even bits of data from the first scan line of data are stored on register 72. At time t3, these bits of data are transferred to registers 74 and 76 in alternate fashion. That is, the data bit from photosite 60a, stored in register 72, is transferred to shift register 76. The data bit from photosite 60b, stored in register 72 is transferred to shift register 74. This continues alternately along the row 60 of photosites to photosite 60 an transferring its data bit stored in register 72 to shift register 76; while photosite 60bn transfers its data bit from storage 72 to shift register 74. As set forth above, these are the even bits for the first scan line of data.

At time t4, the odd bits in photosites 62a, 62b are transferred in similar alternate fashion to shift registers 70, 68, respectively. Thus, scan bits 62a to 62an are transferred at time t4 to shift register 70 while scan bits 62b to 62bn are transferred at time t4 to shift register 68. Thus, at the end of time t4, the scan bits of data for the first line of data now are stored in shift registers 68, 70, 74 and 76. Also at time t4, the even bits of data detected at row 60 of photosites for the second line of data is transferred to storage register 72 via transfer gate 64.

A high speed clock now can be used to shift these signals out to circuitry on or off this single integrated circuit chip for multiplexing together to form a single output pulse train indicative of the scanned video data from line one. The next lines of data are brought before the rows 60 and 62 of photosites and thus, the cycle continues until all the lines of data are scanned and are read out of registers 74, 76, 68 and 70.

Typical dimensions for such a CCD array would include 10 micron wide photosites which are 5 microns high. The length of the device would approximate 1.2 inches (3 cm).

In FIG. 3, when the device 58 is fabricated, an aluminum or other type shield is deposited around the offset rows of 60, 62 of photosites. This shield is deposited so as to accurately define the location and size of the rows of photosites. If in manufacture the definition of aluminum is inaccurate, or out of specification limits, one row or the other of photosites could be larger in size than the other, in the vertical direction on the figure. If this is the case for one or more integrated circuit CCD chips, then the amount of information modulated light impinging on one row will be higher than the amount impinging on the other row. This disparity of light will cause different signal readings from the two rows of photosites which is not indicative of the relative amount of light actually reflected off a document, for example.

Figure 4:
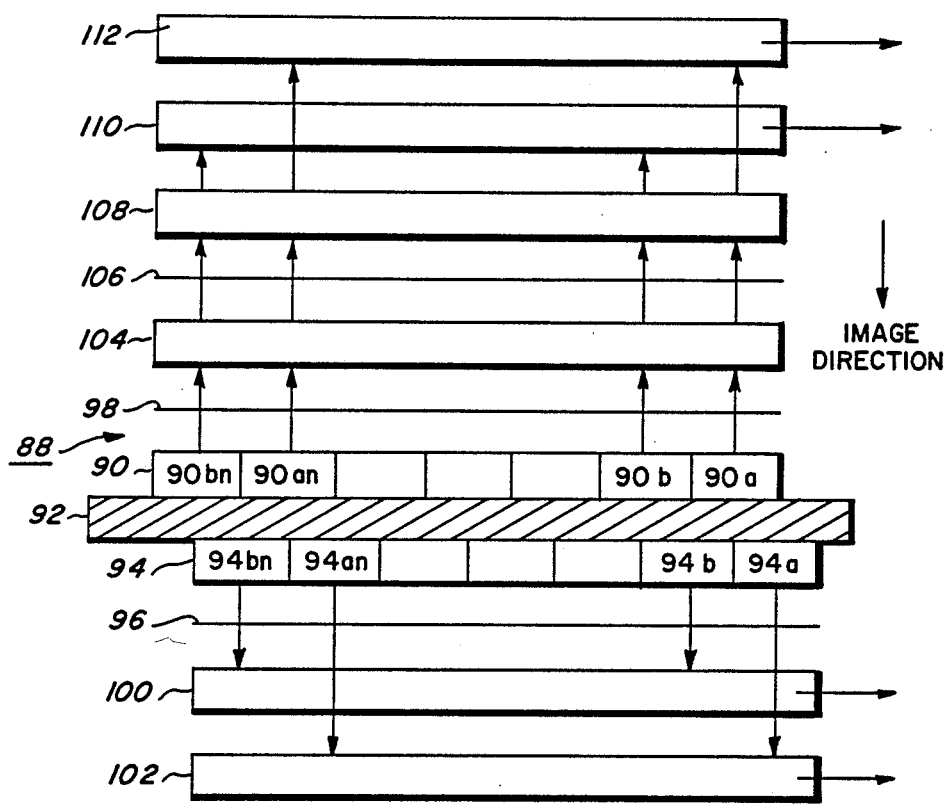
FIG. 4 is a schematic diagram of a charge coupled device for use in an imaging system in accordance with the principles of the present invention.

The embodiment shown in FIG. 4 solves this problem. By separating the offset rows of photosites and depositing a reflective or opaque row or layer therebetween, the necessity for such accurate placement of the mask layer is reduced. That is, the rows 90, 94 of photosites are surrounded by, that is, actually defined by, the layer of aluminum or other suitable material. Thus, the photosite areas remain the same within the limits of the device, even if relaxed somewhat for the reflective or opaque layer. In actual fabrication, the opaque row could actually be covering a row of photosite material on one CCD chip.

The addition of the opaque layer between the offset rows of photosites, however, necessitates the addition of an extra storage register. If the opaque layer is the defined width of one scan line of data projected or impinged on the photosite array, then it will take an additional time interval for a scan line of data to be incremented from row 90 to row 94 of photosites. Even with the extra storage layer, this CCD imager is viable due to the increased production capability during manufacture.

In operation, FIG. 4 shows two rows of sensors 90, 94, separated by area 92 covered with an opaque material, said area 92 possibly being a covered row of photosites. If the relative movement of the scan information is downward in FIG. 4, at time t0, the first scan line of data is projected or otherwise imaged onto the top row 90 of photosites. This row 90 is seen to be detecting the even image bit areas, reading from the right in FIG. 4. At time t0, therefore, the charges generated beneath each photosite is now representative of the data detected in the first scan line. At time t1, the detected signals will be transferred to the first storage layer 104 via transfer gates 98. At the same time, the first line of data will be incremented to opaque row 92, while the second scan line of data appears to row 90 of photosites.

At time t3, the stored charge from the first scan line in storage register 104 is transferred to the second register 108 via transfer gates 106. Also at this time the detected signal from the second scan line of data is transferred to the first storage register 104 via transfer gates 98. In addition, the first scan line of data has reached row 94 of photosites which now reads and detects the odd bits in the first scan line. So at this point, then, the even bits from the first scan line of data appears at storage register 108, while the odd bits from the same scan line is now at row 94 of photosites.

At the next time interval t4, the signals from the first scan line in the second storage register 108 are transferred to shift registers 110, 112 in alternate fashion. That is, alternate photosites 90a to 90an are transferred to shift register 112, while the other alternate photosites 90b to 90bm are transferred to shift register 110. Similarly, at time t5, the charge below photosites 94 are transferred in alternate fashion to shift registers 110, 102 via transfer gates 96. Thus, photosites 94a to 94an are transferred to shift register 102, while the alternate photosites 94b to 94bn are transferred to shift register 100. Before the new time interval t0 can continue for the remaining lines of data, a high speed clock can be applied to the shift registers 100, 102, 110, 112 to shift the data bits out to subsequent circuitry on or off the integrated circuit chip for multiplex action to generate a single train of signals indicative of the information detected on the first scan line of information.

Typical dimensions of the photosites would be 5 microns by 10 microns with the 5 micron dimension being the height of each row of photosites as viewed in FIG. 4, with row 92 of opaque material being 5 microns high also.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A high density charge coupled device imaging array (88) on a single integrated circuit chip, wherein the improvement is characterized by:
   a first row (90) of photosites deposited on said integrated circuit chip, said photosites being sensitive to applied light information,
   a second row (94) of photosites deposited on said integrated circuit chip parallel to but separated from said first row (90) of photosites, said second row (94) of photosites being offset from said first row of photosites approximately one-half the length of the individual photosites in said first row such that said second row of photosites are sensitive to applied light information intermediate the phototsites in said first row of photosites, said first and second rows of photosites comprising a bilinear array of said photosites,
   shield or opaque means between said first (90) and second (94) rows of photosites to shield said imaging array from any said applied light in the area defined by said shield or opaque means,
   a first storage register (104) deposited on said integrated circuit chip adjacent to said first row (90) of photosites to receive and store the bits of light information detected by said first row of photosites (90) and converted to electronic charge information,
   a second storage register (108) deposited on said integrated circuit chip adjacent to said first storage register (104) to receive and store said bits of light information received and stored by said first storage register (104),
   a third storage register (110) deposited on said integrated circuit chip adjacent to said second storage register (108) to receive and store alternate bits of said light information received and stored by said second storage register (108),
   a fourth storage register (112) deposited on said integrated circuit chip adjacent to said third storage register (110) to receive and store the remaining bits of said light information received and stored by said second storage register,
   a fifth storage register (100) deposited on said integrated circuit chip adjacent to said second row (94) of photosites to receive and store alternate intermediate bits of light information detected by said second row (94) of photosites converted to electronic charge information, and
   a sixth storage register (102) deposited on said integrated circuit chip adjacent to said fifth storage register (100) to receive and store the remaining intermediate bits of said light information detected by said second row (94) of photosites converted to electronic charge information.

2. A high density charge coupled device imaging array (88) on a single integrated circuit chip, wherein the improvement is characterized by:
   a first row (90) of photosites deposited on said integrated circuit chip, said photosites being sensitive to applied light information,
   a second row (94) of photosites deposited on said integrated circuit chip parallel to but separated from said first row (90) of photosites, said second row (94) of photosites being offset from said first row of photosites approximately one-half the length of the individual photosites in said first row such that said second row of photosites are sensitive to applied light information intermediate the photosites in said first row of photosites, said first and second rows of photosites comprising a bilinear array of said photosites, a first storage register (104) deposited on said integrated circuit chip adjacent to said first row (90) of photosites to receive and store the bits of light information detected by said first row of photosites (90) and converted to electronic charge information, a second storage register (108) deposited on said integrated circuit chip adjacent to said first storage register (104) to receive and store said bits of light information received and stored by said first storage register (104), a third storage register (110) deposited on said integrated circuit chip adjacent to said second storage register (108) to receive and store alternate bits of said light information received and stored by said second storage register (108), a fourth storage register (112) deposited on said integrated circuit chip adjacent to said third storage register (110) to receive and store the remaining bits of said light information received and stored by said second storage register, a fifth storage register (100) deposited on said integrated circuit chip adjacent to said second row (94) of photosites to receive and store alternate intermediate bits of light information detected by said second row (94) of photosites converted to electronic charge information, and a sixth storage register (102) deposited on said integrated circuit chip adjacent to said fifth storage register (100) to receive and store the remaining intermediate bits of said light information detected by said second row (94) of photosites converted to electronic charge information.

3. The imaging array as set forth in claim 2 wherein said third (110), fourth (112), fifth (100), and sixth (102) storage registers comprise a quadrilinear array such that all four registers contain the detected light information from one line of scan at the same time.

4. The imaging arrays as set forth in claim 3 further including:
transfer gate means (96, 98, 104) deposited between the first row (90) of photosites and the first storage register (104), the first storage register (104) and the third (110) and fourth (112) storage registers, the second row (94) of photosites and the fifth (100) and sixth (102) storage registers, said transfer gate means also being deposited on said integrated circuit chip to provide paths for the movement of said electronic charge information.

5. A high density charge coupled device imaging array (88) on a single integrated circuit chip for use in detection of information contained on repetitive line scans wherein the improvement is characterized by:

a first row (90) of photosites formed on said integrated circuit chip, said photosites being sensitive to applied light information in one scan line in the form of data bits by depositing electronic charge in the substrate of said chip in response to said applied light information, a second row (94) of photosites formed on said integrated circuit chip parallel to but separated from said first row (90) of photosites a distance about equal to about one scan line, said second row (94) of photosites being offset from said first row (90) of photosites intermediate the centers of the photosites in said first row of photosites such that said second row of photosites are sensitive to applied light information in one scan line in the form of data bits by depositing electronic charge in the substrate of said chip in response to applied light information intermediate the photosites in said first row of photosites, said first and second row of photosites comprising a bilinear array of said photosites which consecutively scan the same lines of information in a raster scan type of arrangement, a shield or opaque layer between said first (90) and second (94) rows of photosites to shield said imaging array from any said applied light in the area defined by said shield or opaque layer, a first storage register (104) formed on said integrated circuit chip adjacent to said first row (90) of photosites to receive and store said data bits from a scan line of information detected by said first row of photosites (90), a second storage register (108) deposited on said integrated circuit chip adjacent to said first storage register (104) to receive and store said data bits received and stored by said first storage register (104), a third storage register (110) deposited on said integrated circuit chip adjacent to said second storage register (108) to receive and store alternate bits of said data bits received and stored by said second storage register (108), a fourth storage register deposited on said integrated circuit chip adjacent to said third storage register (110) to receive and store the remaining data bits of said scan line of information received and stored by said second storage register, a fifth storage register (100) deposited on said integrated circuit chip adjacent to said second row (94) of photosites to receive and store alternate intermediate data bits from a scan line of information detected by said second row (94) of photosites, and a sixth storage register (102) deposited on said integrated circuit chip adjacent to said fifth storage register (100) to receive and store the remaining intermediate data bits from said scan line of information detected by said second row (94) of photosites.

6. A high density charge coupled device imaging array (88) on a single integrated cicuit chip for use in detection of information contained on repetitive line scans wherein the improvement is characterized by:

a first row (90) of photosites formed on said integrated circuit chip, said photosites being sensitive to applied light information in one scan line in the form of data bits by depositing electronic charge in the substrate of said chip in response to said applied light information, a second row (94) of photosites formed on said integrated circuit chip parallel to but separated from said first row (90) of photosites a distance about equal to one scan line, said second row (94) of photosites being offset from said first row (90) of photosites intermediate the centers of the photosites in said first row of photosites such that said second row of photosites are sensitive to applied light information in one scan line in the form of data bits by depositing electronic charge in the substrate of said chip in response to applied light information intermediate the photosites in said first row of photosites, said first and second rows of photosites comprising a bilinear array of said photosites which consecutively scan the same lines of information in a raster scan type of arrangement, a first storage register (104) formed on said integrated circuit chip adjacent to said first row (90) of photosites to receive and store said data bits from a scan line of information detected by said first row of photosites (90), a second storage register (108) deposited on said integrated circuit chip adjacent to said first storage register (104) to receive and store said data bits received and stored by said first storage register (104), a third storage register (110) deposited on said integrated circuit chip adjacent to said second storage register (108) to receive and store alternate bits of said data bits received and stored by said second storage register (108), a fourth storage register deposited on said integrated circuit chip adjacent to said third storage register (110) to receive and store the remaining data bits of said scan line of information received and stored by said second storage register, a fifth storage register (100) deposited on said integrated circuit chip adjacent to said second row (94) of photosites to receive and store alternate intermediate data bits from a scan line of information detected by said second row (94) of photosites, and a sixth storage register (102) deposited on said integrated circuit chip adjacent to said fifth storage register (100) to receive and store the remaining intermediate data bits from said scan line of information detected by said second row (94) of photosites.

7. The imaging array as set forth in claim 6 wherein said third (110), fourth (112), fifth (100), and sixth (102) storage registers comprise a quadrilinear array such that all four registers contain the detected light information from one line of scan at the same time.

8. The imaging array as set forth in claim 7 further including:

transfer gate means (96, 98, 104) formed between the first row (90) of photosites and the first storage register (104), the first storage register (104) and the third (110) and fourth (112) storage registers, the second row (94) of photosites and the fifth (100) and sixth (102) storage registers, said transfer gate means also being formed on said integrated circuit chip to provide paths for the movement of said data bit information.

9. A high density charge coupled device imaging array (88) on a single integrated circuit chip, wherein the improvement is characterized by:

a first row (90) of photosites deposited on said integrated ciricuit chip, said photosites being sensitive to applied light information, a second row (94) of photosites deposited on said integrated circuit chip parallel to but separated from said first row (90) of photosites, said second row (94) of photosites being offset from said first row of photosites approximately one-half the length of the individual photosites in said first row such that said second row of photosites is sensitive to applied light information intermediate the photosites in said first row of photosites, said first and second rows of photosites comprising a bilinear array of said photosites, and shield or opaque means between said first (90) and second (94) rows of photosites to shield said imaging array from any said applied light in the area defined by said shield or opaque means, wherein said shield or opaque means covers an area of said imaging array which comprises a third row of photosites.

10. A high density charge coupled device imaging array (88) on a single integrated circuit chip for use in detection of information contained on repetitive line scans wherein the improvement is characterized by:

a first row (90) of photosites formed on said integrated circuit chip, said photosites being sensitive to applied light information in one scan line in the form of data bits by depositing electronic charge in the substrate of said chip in response to said applied light information, a second row (94) of photosites formed on said integrated circuit chip parallel to but separated form said first row (90) of photosites a distance about equal to one scan line, said second row (94) of photosites being offset from said first row (90) of photosites intermediate the centers of the photosites in said first row of photosites such that said second row of photosites are sensitive to applied light information in one scan line in the form of data bits by depositing electronic charge in the substrate of said chip in response to applied light information intermediate the photosites in said first row of photosites, said first and second rows of photosites comprising a bilinear array of said photosites which consecutively scan the same lines of information in a raster scan type of arrangement, and a shield or opaque layer between said first (90) and second (94) rows of photosites to shield said imaging array from any said applied light in the area defined by said shield or opaque layer, wherein said shield or opaque layer covers an area of said imaging array which comprises a third row of photosites.

* * * * *